UNITED STATES PATENT OFFICE.

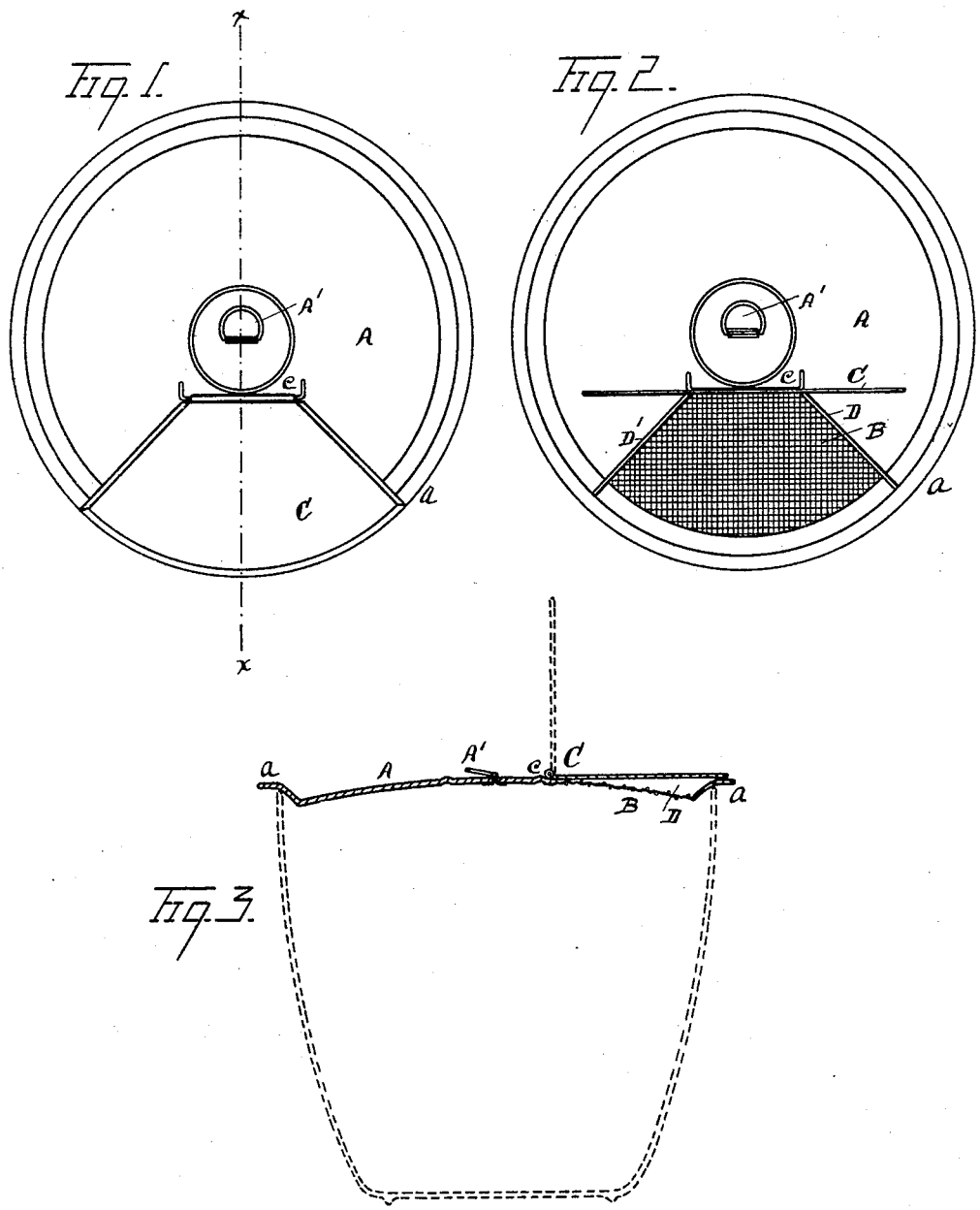

HANNAH S. DIACK, OF DETROIT, MICHIGAN.

LID-STRAINER.

SPECIFICATION forming part of Letters Patent No. 481,166, dated August 23, 1892.

Application filed March 30, 1892. Serial No. 427,066. (No model.)

*To all whom it may concern:*

Be it known that I, HANNAH S. DIACK, a citizen of the United States, residing at Detroit, county of Wayne, State of Michigan, have invented a certain new and useful Improvement in Lid-Strainers; and I declare the following to be a full, clear, and exact description of the invention, such as will enable others skilled in the art to which it appertains to make and use the same, reference being had to the accompanying drawings, which form a part of this specification.

My invention has for its object a novel lid-strainer of simple and economical construction and of general utility.

To these ends my invention consists of the devices and appliances, their construction, combination, and arrangement, as hereinafter described and claimed, and illustrated in the accompanying drawings, in which—

Figure 1 is a plan view showing the cover closed. Fig. 2 is a similar view showing the cover opened. Fig. 3 is a vertical section on line $x\ x$, Fig. 1.

It is well known that as lids or covers for various utensils have heretofore been constructed—such, for instance, as pots, kettles, collanders, and analogous devices—where the water is to be poured off from vegetables or other articles being cooked therein there is great liability of scalding or burning the hand of the operator, while, also, difficulty is experienced in retaining said articles in the utensil and preventing their escape therefrom. A lid-strainer, therefore, adapted for application to various utensils is a very desirable and useful provision, and to supply this want is the purpose of my invention, which I carry out as follows:

In the drawings, A represents a lid, preferably formed with a raised rim or bead, as shown at $a$.

A' is any suitable handle.

B denotes a strainer, preferably made of suitable wire fabric, secured to the lid, the lid being cut away to give room for the strainer.

C denotes a cover hinged to the lid, as shown at $c$, and adapted to close down over the strainer and to shield the hand of the operator in the act of pouring off the water. At the lateral sides of the strainer I locate flanges or walls D D', rising at the periphery of the cover to a height even with the top of the bead $a$ and running to a point toward the hinge $c$. Said walls are united to and form a part of the lid. This construction, it will be observed, is such as to allow the cover C to close down tightly upon the top of the bead, the upper edges of said side walls D D', and upon the lid proper adjacent to the hinge, thereby forming in effect a tight joint down upon the underlying portions of the device. As thus constructed it is evident that a chamber is formed between the closed cover C and the underlying strainer, bounded laterally by the walls D D' and at front and rear by the raised bead $a$ and the face of the lid A. In turning over the utensil to discharge the water the water filling said chamber is effectually prevented from passing from said chamber over the adjacent surfaces of the lid, as would be the case but for said side walls. The side walls D D' thus serve a very useful purpose in such prevention, inasmuch as did they not prevent the lateral spread of the water there would be liability of burning the hand. As so constructed, however, said side walls confine the water laterally in its discharge underneath the cover C, thus effectually shielding the hand. The pressure of the water discharging will open the cover C sufficiently. Should it be desired, it can be thrown upward into the position shown in Fig. 2, in which position it still shields the hand, the water being still confined by the side walls D D' from spreading laterally beyond the lateral edges of the cover C. This lid-strainer can be made in desired sizes and will fit various utensils the same as ordinary separable kettle-covers, while it possesses the added advantages above described.

The strainer feature, side walls, and cover may be applied to any shaped lid. It will be seen that in cutting away the lid for the strainer the raised rim is preferably left intact. This construction, it will be seen, also affords a ready means for ventilating the utensil upon which the cover is placed, since by throwing up the cover the steam may readily escape.

The lid A, other than the strainer attachments and related parts, is of ordinary construction, conforming to customary patterns commonly used by tinners.

I do not limit myself to the use of wire-cloth for the strainer, as the strainer portion of the device might be made by suitably perforating the lid A.

In the claims I use the word "strainer" to include either the perforations of the lid or a wire-cloth.

What I claim as my invention is—

1. A lid-strainer consisting of a lid provided with a strainer, side walls united to and forming a part of the lid, bounding the strainer laterally, and a hinged cover located over the strainer and closing down upon said side walls, substantially as set forth.

2. A lid-strainer consisting of a lid formed with a raised rim at its periphery and provided with a strainer located within said rim, walls D D', united to and forming a part of the lid, located at the sides of the strainer, and a hinged lid closing down at its sides upon said walls and at its front edge upon said rim and forming a chamber between the lid and the underlying walls, rim, and strainer, substantially as described.

In testimony whereof I sign this specification in the presence of two witnesses.

HANNAH S. DIACK.

Witnesses:
N. S. WRIGHT,
JOHN F. MILLER.